C. SCHOETTLE.
SAFETY BULL LEADER.
APPLICATION FILED MAR. 6, 1914.

1,270,557.

Patented June 25, 1918.

Witnesses:

Inventor
Charles Schoettle.
by Burton & Burton
his Attys.

UNITED STATES PATENT OFFICE.

CHARLES SCHOETTLE, OF PHILLIPS, WISCONSIN, ASSIGNOR TO FRIEDLEY-VOSHARDT COMPANY, OF CHICAGO, ILLINOIS, A CORPORATION OF ILLINOIS.

SAFETY BULL-LEADER.

1,270,557.  Specification of Letters Patent.  Patented June 25, 1918.

Application filed March 6, 1914. Serial No. 822,803.

*To all whom it may concern:*

Be it known that I, CHARLES SCHOETTLE, a citizen of the United States, residing at Phillips, in the county of Price and State of Wisconsin, have invented new and useful Improvements in Safety Bull-Leaders, of which the following is a specification, reference being had to the accompanying drawings, forming a part thereof.

The purpose of this invention is to provide a substitute for the usual leading strap or chain employed for guiding and managing bulls and other domestic animals, the present device being designed particularly as a bull leader with a view to increasing the safety of handling such animals. It consists of the features and elements described and shown in the drawings as indicated by the claims.

In the drawings:—

Figure 1:
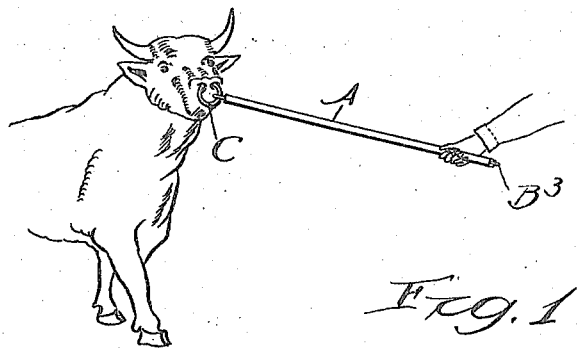
Figure 1 is a general view of the device in use.
Figure 2:
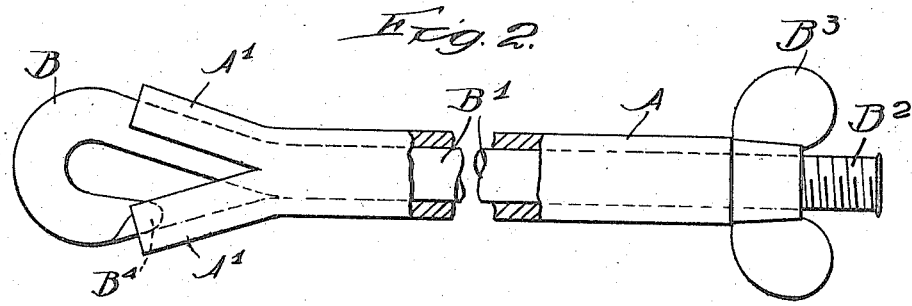
Fig. 2 is a side elevation partly in section showing details of construction.
Figure 3:
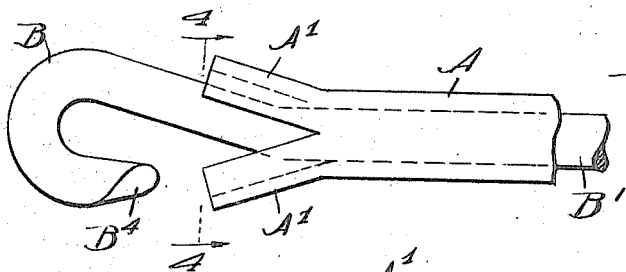
Fig. 3 is a detail view showing the hook portion in open position.
Figure 4:
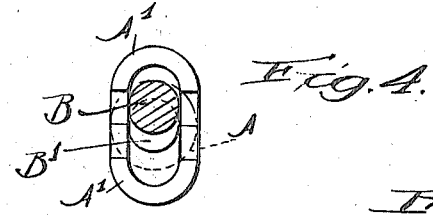
Fig. 4 is a detail section taken as indicated at line 4—4 on Fig. 3.

The inherent disadvantage of a chain, strap or other flexible leader when used for a bull is that such a device provides no means of checking the animal if he attempts to rush at the person handling the leader, and for this reason the present device consists of a rigid tubular rod, A, provided with a hook, B, at one end designed to engage the usual ring, C, which is fixed in the nose of the bull. The member, A, may be from three to four feet in length to permit the person handling it to remain at a safe distance from the animal, and by virtue of its rigidity offers a very efficient means of control. The shank, $B^1$, of the hook B, extends entirely through the length of the tubular member, A, and is provided with a threaded portion, $B^2$, which projects from the end of the tube and carries a wing nut, $B^3$. The opposite end of the tube, A, is split for a short distance and flared at $A^1$, to conform to the hook, B. It will be understood that the shank portion, $B^1$, is slidable longitudinally in the tube, A, so long as the wing nut, $B^3$, is left loose so that with the hook, B, withdrawn from the tube, as shown in Fig. 3, the device may be engaged with the ring, C, in the nose of the bull and the hook may then be closed by sliding up the flared portion, $A^1$, of the tube, A, to cover the point, $B^4$, of the hook, as shown in Fig. 2, the parts being secured in this position by screwing up the wing nut, $B^3$, to abut the tube, A. The range of adjustment of the nut, $B^3$, is so limited that the off-set portion of the hook, B, will never move beyond control of the flared portion, $A^1$, of the tube, thus insuring that the hook will always be directed back to closed position by means of the flared guides, $A^1$. Thus in closed position the hook, B, becomes merely a rigid eye at the end of the leader, and in managing an unruly animal the leader may even be slightly turned so as to twist the nose ring, C, sufficiently to keep the animal under control.

I claim:—

1. A device for the purpose indicated comprising a tube, a hook having a shank which extends slidably through said tube, the end of the tube being split to form a guard for closing the opening of the hook, and the inner edge of such guard being approximately alined with the axis of the tube, and locking means at the other end of the shank for securing the hook against sliding in the tube.

2. A device for the purpose indicated comprising a tube split open at one end, a hook having a shank which extends slidably through said tube, one portion of the split end of the tube serving as a guard to close the opening of the hook, an inner edge of said guard being but slightly oblique to the axis of the tube and the hook being connected to its shank by a portion slightly oblique to said tube axis and disposed opposite said guard whereby said connecting portion of the hook and the inner edge of said guard converge to form an acute angle opposite the end of the hook loop, and means at the other end of the shank for holding the guard in closed position.

In testimony whereof I have hereunto set my hand at Phillips, Wis., this 27th day of February, 1914.

CHARLES SCHOETTLE.

Witnesses:
FRANK GLISSENDORF,
ASA K. OWEN.